United States Patent [19]

Kaluzhsky et al.

[11] 4,026,672

[45] May 31, 1977

[54] PLANT FOR FLUIDIZED BED HEAT TREATMENT OF POWDERED ALUNITE

[76] Inventors: Nikolai Andreevich Kaluzhsky, Sredny prospekt, 6, kv. 23; Faitel Markovich Rubinchik, prospekt Maklina, 11, kv. 77; Gakif Zakirovich Nasyrov, prospekt Nauki, 12, kv. 49; German Abramovich Kaim, Ligovsky prospekt, 9, kv. 5; Vitaly Mikhailovich Averin, Gorodok, 8, kv. 19; Savely Mikhailovich Milrud, ulitsa Vavilovykh, 11/6, kv. 130; Garry Vladimirovich Telyatnikov, ulitsa Varshavskaya, 118, kv. 34; Viktor Prokhorovich Lyakhov, ulitsa Ordzhonikidze, 30, kv. 72; Ljudmila Nikolaevna Abramova, ulitsa Kartashikhina, 31, kv. 106; Vladimir Ivanovich Tarasov, Kirovsky prospekt, 42, kv. 11; Vladislav Mikhailovich Denisov, prospekt Kosmonavtov, 92, kv. 136; Dinam Latypovich Nasyrov, prospekt Veteranov, 99, kv. 125, all of Leningrad; Boris Alexandrovich Stolyar, ulitsa Shaumiana, 37, Kirovabad; Muzafar Suleiman-ogly Tagiev, ulitsa Aljuminschikov, 2, kv. 10, Kirovabad; Vladimir Ivanovich Lagno, ulitsa Shaumiana, 1, kv. 8, Kirovabad; Vladimir Nikolaevich Kostin, Savinskaya naberezhnaya, 3, kv. 82, Moscow, all of U.S.S.R.

[22] Filed: Feb. 20, 1976

[21] Appl. No.: 659,693

[52] U.S. Cl. .................................. 23/262; 23/260; 23/277 R; 23/284; 432/15; 432/58
[51] Int. Cl.² .................. B01J 6/00; B01J 8/26; B01J 8/36; F27B 15/00
[58] Field of Search ........ 23/262, 260, 284, 277 R; 432/15, 58; 34/57 A

[56] References Cited

UNITED STATES PATENTS

| | | |
|---|---|---|
| 2,506,542 | 5/1950 | Caldwell, Jr. et al. ........ 23/284 UX |
| 3,236,607 | 2/1966 | Porter, Jr. et al. .................. 23/284 |
| 3,282,577 | 11/1966 | Cottle ............................. 432/58 X |
| 3,910,755 | 10/1975 | Syska ............................. 432/58 X |

FOREIGN PATENTS OR APPLICATIONS

| | | |
|---|---|---|
| 261,969 | 1970 | U.S.S.R. |
| 273,804 | 1970 | U.S.S.R. |

Primary Examiner—Joseph Scovronek
Attorney, Agent, or Firm—Lackenbach, Lilling & Siegel

[57] ABSTRACT

A plant, comprising apparatus for sequential fluidized bed roasting, reducing and cooling of powdered alunite, mounted on a support and communicating with devices for supplying gas into each apparatus and with cyclones for trapping powdered alunite from flue gases and returning it into said apparatus. According to the invention, built-in the plant in front of the apparatus for roasting alunite, is a shaft heat exchanger having at least one throat subdividing its interior in height into a top and bottom chamber with the ratio of the passage cross-sectional areas of the wide and narrow parts falling within a range of from 2 to 12. The top chamber of the shaft heat exchanger communicates with a cyclone heat exchanger via a supply pipe to which is connected an initial alunite feeder and a cyclone, the bottom chamber of the shaft heat exchanger being in communication with a means for producing flue gases and a pipe discharging gas from the apparatus for reducing alunite though a cyclone.

The plant may comprise the second heat exchanger built-in intermediate of the apparatus for roasting and that for reducing alunite.

As compared with the known similar plants, the plant, according to the invention, provides for the production of alunite featuring a higher quality and at much lower expenditures.

5 Claims, 2 Drawing Figures

PLANT FOR FLUIDIZED BED HEAT TREATMENT OF POWDERED ALUNITE

The present invention relates to plants for fluidized bed heat treatment of powdered alunite for producing such products as, e.g., alumina, sulphuric acid, potassium sulphate and vanadium compound.

It is common knowledge that the most important raw material for producing alumina is bauxite whose world resources are now almost depleted. Therefore a possibility of using alunite ores on an industrial scale is a crucial problem, insofar as the profitability of their complex processing is provided by the production of not only alumina but of such valuable products, as sulphuric acid, potassium sulphate and vanadium pentoxide.

The herein-proposed plant may be of particular advantage for heat treating powdered alunite, since it brings economies in the production of alumina from alunite and rules out external losses of sulphureous gaseous products.

At present wide application has found a plant, comprising apparatus for fluidized bed roasting of alunite, fluidized bed reducing of roasted alunite and fluidized bed cooling of reduced alunite (Inventor's Certificate of the USSR No. 273804 filed on Feb. 19, 1966), all the apparatus being mounted on a support and communicating with each other by means of pipe lines. The apparatus for roasting alunite is fitted with means for producing flue gases. The apparatus for reducing roasted alunite is provided with devices for feeding reducing reagents. Moreover, all the apparatus for roasting, reducing and cooling of alunite are equipped with cyclones for trapping powdered alunite from gases discharged from said apparatus via pipes, and with pipings for returning the collected alunite into appropriate apparatus.

The plant includes also a feeder for supplying initial alunite into the apparatus for roasting alunite, and a device for feeding reagents to the apparatus for reducing alunite.

In practice the plant ensured a sufficiently high recovery of alumina and dissociation of aluminium sulfate contained in alunite.

At the same time in the course of operation some difficulties stipulated by the plant design were brought out.

Thus, in the apparatus for roasting alunite the dissociation of aluminium sulphate and sulphur losses took place when burning fuel in the fluidized bed.

Moreover, roasting failed to provide complete dehydration of alunite and the removal of remaining moisture required a higher consumption of reducer in the apparatus for fluidized bed reducing of roasted alunite.

To enable better distribution and utilization of both the fuel and reducer high fluidized beds of alunite being processed are set up in the plant apparatus.

This, however, results in higher power inputs that are required to overcome the hydraulic resistance of the fluidized bed of alunite.

The use of high fluidized beds of alunite added to its heat-treating time, which adversely affected the quality of reduced alunite and enhanced alumina losses due to its conversion to another form insoluble in alkalis during subsequent hydrochemical processing of the reduced alunite.

Known in the art is a plant, comprising a vertical furnace for heat treating powdered materials in several fluidized beds communicating with each other by means of pipe lines (Inventor's Certificate of the USSR No. 261969 filed on Aug. 10, 1966).

However, considerable mass transfer between the fluidized beds of fine-disperse material being processed caused troubles in operation owing to clogged pipes and losses of sulphur and alumina.

The principal object of the present invention is the provision of a plant for fluidized bed heat treatment of alunite which would be more efficient in service due to lower power consumption, as compared with the known plants of similar application.

Another no less important object of the invention is to provide a reduction in alumina and sulphur losses and in the consumption of reagents employed for the fluidized bed reduction of alunite.

Still another object of the invention is to cut outlays by providing a more compact plant than the known similar plants.

Said and other objects are achieved by providing a plant for fluidized bed heat treatment of powdered alunite, comprising an initial alunite feeder and apparatus for sequential roasting, reducing and cooling of powdered alunite, all of them being mounted on a support and each apparatus being fitted with a device for forced feed of gas therein, a cyclone for trapping powdered alunite from gas and with a pipe for returning the collected alunite, and there is provided a device for supplying reagents into the apparatus for reducing alunite, in which plant, according to the invention, built-in before the apparatus roasting powdered alunite is a shaft heat exchanger having at least a single throat subdividing its interior in height into a top and a bottom chamber so that the ratio of the passage cross-sectional areas of its wide and narrow parts falls within a range of from 2 to 12, and there is a cyclone heat exchanger communicating with the top chamber of said shaft heat exchanger via a supply and a descent pipe, the initial alunite feeder being connected to the supply pipe, and there are provided a cyclone for trapping powdered alunite from the gas flowing out of the cyclone heat exchanger, and a descent pipe for feeding the collected alunite to the bottom chamber of the shaft heat exchanger which communicates with the apparatus for roasting alunite, the means for producing and forced feeding of flue gases therein and with a pipe discharging gas from the cyclone of the apparatus for roasting alunite.

The plant including the shaft heat exchanger of the above-outlined design, built-in before the apparatus for roasting alunite, offers a reduction in power consumption, since it uses the heat of gases discharged from the apparatus for fluidized bed roasting of alunite for preheating and dehydrating initial alunite. The cyclone heat exchanger in communication with the shaft heat exchanger via the pipe to which is connected the initial alunite feeder allows using the heat of gases flowing out of the top chamber of the shaft heat exchanger for heating the alunite. This decreases the temperature of gases after the cyclone heat exchanger and provides a saving in fuel for roasting alunite.

The introduction of flue gases from the furnace into the bottom chamber of the shaft heat exchanger permits obviating the burning of fuel in a layer of alunite, by virtue of which roasting occurs without the dissociation of aluminium sulphate and sulphur losses with flue gases.

Owing to at least a single throat subdividing the interior of the shaft heat exchanger in height into two chambers with the ratio of the passage cross-sectional areas of the wide and narrow parts varying within a range of from 2 to 12, the speed of heating gases attained in the narrow portion of the shaft heat exchanger is sufficiently high for a prescribed holding of alunite in the shaft heat exchanger. As to the wide part of the shaft heat exchanger, its passage cross-sectional area is selected to ensure a minimum carry-away of alunite.

In case the ratio of the passage cross-sectional areas of the wide and narrow parts of the shaft heat exchanger exceeds 12, the time period within which the alunite stays in the shaft heat exchanger is extended with the ensuring reduction in the plant output, lower quality of roasted alunite and an increase in power requirements.

A reduction in the ratio of the passage cross-sectional areas of the wide and narrow parts below 2 decreases the degree of dehydration of alunite and its heating efficiency.

A system comprising a shaft and a cyclone heat exchanger features a much lower hydraulic resistance than the fluidized bed apparatus, which makes it possible to diminish energy requirements of the process.

Alunite being held in both the shaft and cyclone heat exchangers, the duration of its stay in the fluidized bed apparatus decreases and alkali-soluble alumina losses diminish.

Owing to high linear speeds of a gas stream when heat treating alunite in the shaft and cyclone heat exchangers, as compared with those in the fluidized bed apparatus, small-size heat exchangers can be employed.

Preliminary heat treatment of alunite in the cyclone and shaft heat exchangers offers a reduction in thermal load on the apparatus for fluidized bed roasting of alunite and in its overall dimensions and provides a saving in the outlays for the construction of the plant, as a whole.

Preliminary dehydration of alunite in the cyclone and shaft heat exchangers enables the dehydration process to be completed in the roasting apparatus, decreasing thereby reducer consumption during subsequent reduction of the roasted alunite.

It is expedient that the second shaft heat exchanger be built-in intermediate of the apparatus for roasting and that for reducing alunite, the top chamber of the above heat exchanger being connected via a pipe to the apparatus for roasting alunite and via a supply and a descent pipe to a cyclone, its bottom chamber being connected to the apparatus for reducing alunite and fitted with a branch pipe for supplying heated gas thereto.

The use of the second shaft heat exchanger makes it possible to decrease reducer requirements for the dissociation of aluminium sulphate contained in the alunite by using unreacted reducer, that has passed through an alunite fluidized bed in the apparatus, for reducing the roasted alunite. Moreover, the second shaft heat exchanger is employed for additional heating and partial reducing of the roasted alunite fed from the apparatus for fluidized bed roasting of alunite. The alunite is heated by burning some reducer in a stream of heated gas introduced through the branch pipe into the bottom chamber of the shaft heat exchanger.

The application of the second shaft heat exchanger enables also alunite heating and reducing time to be diminished materially due to high heat and mass transfer coefficients employed as compared with those in the apparatus for fluidized bed reducing of alunite; it also allows decreasing the losses of alkali-soluble alumina.

Hydraulic resistance of alunite suspended in the shaft heat exchanger is lower than that of alunite accommodated in a fluidized bed apparatus which makes it possible to decrease the pressure of gas that is passed through the heat exchanger and energy requirements. Higher speeds of a gas stream for treating alunite in the shaft heat exchanger, as compared with those attained in a fluidized bed apparatus, allow using a small-size shaft heat exchanger and cutting the outlays for the construction of the plant. Partial reduction effected in the shaft heat exchanger offers a decrease in both the thermal and material loads on the apparatus for fluidized bed reducing of roasted alunite, as well as in the outlays for the construction of the plant, as a whole.

At least one of the apparatus for fluidized bed heat treatment of powdered alunite can be made with a length-to-width ratio varying within a range of from 5 to 15.

In the apparatus featuring the above-specified length-to-width ratio alunite circulation within the fluidized bed is decreased which has a favourable effect on the quality of alunite and on the orientation of an alunite stream from the loading to unloading location.

The adopted length-to-width ratio is most efficient since when it is less than 5 untreated alunite happens to get to the unloading location, whereas with a ratio exceeding 15 the apparatus become inconvenient for attendance.

Since the heat treating operation requires less time, the plant using the fluidized bed apparatus with the proposed length-to-width ratio is more compact than the known ones and requires lower outlays for its construction.

The nature of the invention will be clear from the following detailed description of the particular embodiments of a plant for fluidized bed heat treatment of powdered alunite to be had in conjunction with the accompanying drawings, in which.

Figure 1:
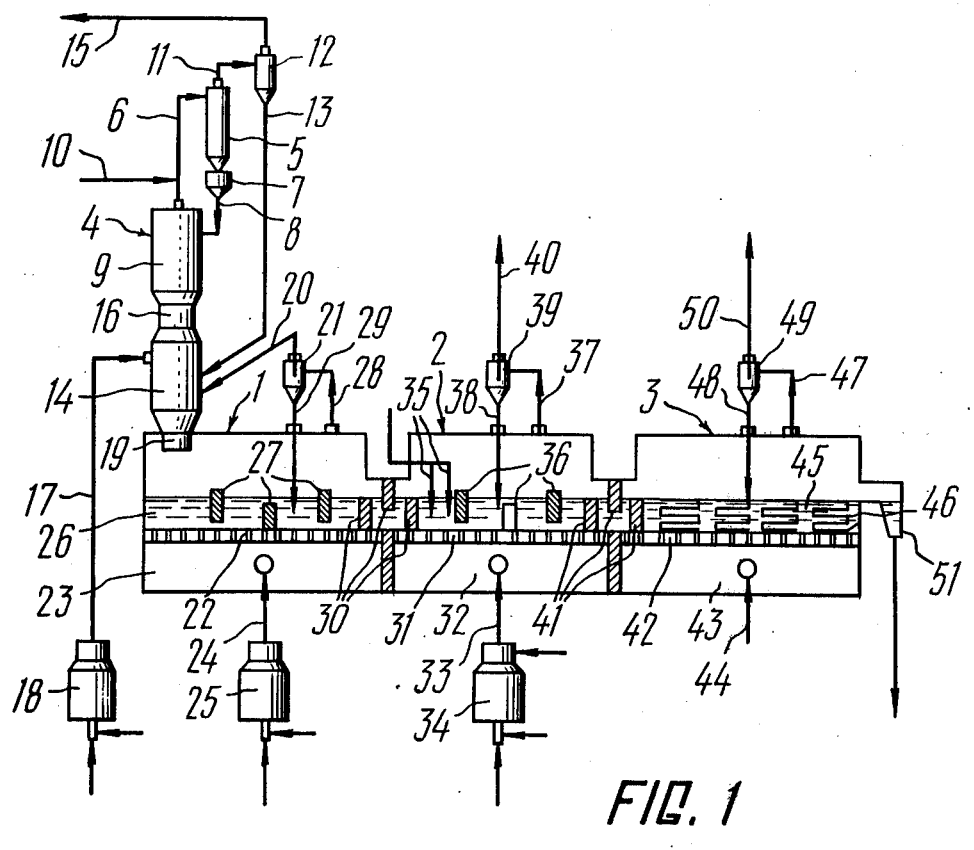
FIG. 1 shows diagrammatically the first exemplary embodiment of a plant, according to the invention, with a shaft heat exchanger arranged before an apparatus for roasting alunite.

A plant for fluidized bed heat treatment of powdered alunite comprises the following facilities mounted on a support (not shown in the drawing) and employed in the known plants: an apparatus 1 (FIG. 1) for fluidized bed roasting of alunite, an apparatus 2 for fluidized bed reducing of roasted alunite and an apparatus 3 for fluidized bed cooling of reduced alunite, as well as a shaft heat exchanger 4 and a cyclone heat exchanger 5 for roasting alunite added to the plant, according to the invention.

The cyclone heat exchanger 5 is adapted for heating alunite to drive off extraneous moisture therefrom. The cyclone heat exchanger 5 is connected to a top chamber 9 of the shaft heat exchanger 4 via a supply pipe 6, hopper 7 and a descent pipe 8.

The supply pipe 6 is furnished with a feeder 10 for introducing initial powdered alunite therein. The cyclone heat exchanger 5 communicates also via a discharge pipe 11 with a cyclone 12 adapted for removing dust from gases flowing out of the cyclone heat exchanger 5. The cyclone 12 communicates with a bottom chamber 14 of the shaft heat exchanger 4 via a pipe 13 and with the atmosphere via a discharge pipe 15.

The shaft heat exchanger 4 is adapted for heating alunite to drive off some hydrate moisture therefrom. The shaft heat exchanger 4 has a throat 16 subdividing its interior into the top chamber 9 and the bottom chamber 14 so that the ratio of the passage cross-sectional areas of a wide and narrow part falls within a range of from 2 to 12.

The top chamber 9 communicates with the cyclone heat exchanger 5 by means of the supply pipe 6, descent pipe 8 and the hopper 7. The bottom chamber 14 of the shaft heat exchanger 4 is connected to the cyclone 12 via the descent pipe 13, to a means (furnace) 18 for producing flue gases via a pipe 17, to the apparatus 1 for fluidized bed roasting of alunite via a pipe 19 and to a cyclone 21 via a discharge pipe 20.

The apparatus 1 for roasting alunite, in which the roasting operation is accompanied by driving off hydrate moisture, is provided with a gas distributing grate 22. Arranged under the grate 22 is a gas distributing chamber 23 communicating via a pipe 24 with a means (furnace) 25 for producing flue gases. Mounted above the grate 22 in a fluidized bed 26 are vertical baffles 27 precluding circulation of alunite in the fluidized bed. The apparatus 1 for fluidized bed roasting of alunite communicates with the bottom chamber 14 of the shaft heat exchanger 4 via the pipe 19, and with the cyclone 21 adapted for driving off dust from gases discharged from the apparatus 1 for fluidized bed roasting of alunite via a supply pipe 28 and a descent pipe 29. The cyclone 21 is connected via the discharge pipe 20 to the bottom chamber 14 of the shaft heat exchanger 4. The apparatus 1 for roasting alunite communicates with the apparatus 2 for fluidized bed reducing of roasted alunite through means, such as a channel of a labyrinth device 30. The latter prevents the gaseous components accommodated in the apparatus 1 for roasting alunite from mixing with those in the apparatus 2 for reducing alunite.

The apparatus 2 for reducing roasted alunite is fitted with a gas-distributing grate 31 under which is arranged a gas-distributing chamber 32 connected via a pipe 33 to a means (furnace) 34 for producing flue gases. Located above the gas-distributing grate 31 in the fluidized bed of the apparatus 2 for reducing alunite are devices 35 for supplying reducing reagents and vertical baffles 36 precluding the backflow of reduced alunite in the fluidized bed, i.e. from the unloading to the loading location. The apparatus 2 for reducing alunite communicates via a supply pipe 37 and a descent pipe 38 with a cyclone 39 for deducting sulphur dioxide gas coming out of the apparatus 2 for reducing alunite. The cyclone 39 has a discharge pipe 40 for supplying sulphur dioxide gas for further processing, e.g., for producing sulphuric acid.

The apparatus 2 for fluidized bed reducing of roasted alunite communicates with the apparatus 3 for fluidized bed cooling of reduced alunite via the channel of a labyrinth device 41.

The labyrinth device 41 precludes the intermixing of gaseous components accommodated in the apparatus 2 and apparatus 3. The apparatus 3 for cooling alunite is equipped with a gas-distributing grate 42 under which is arranged a gas-distributing chamber 43 with an air supply branch pipe 44 adapted for creating a fluidized bed of alunite and for its cooling. Mounted above the gas-distributing grate 42 within a fluidized bed 45 are heat-exchanging devices 46 made up of tubes in which coolant is circulating. The apparatus 3 for cooling alunite is connected via a supply pipe 47 and a descent pipe 48 to a cyclone 49 for removing dust from gases flowing out of the apparatus 3 for cooling alunite. The cyclone 49 is fitted with an exhaust pipe 50 through which it communicates with the atmosphere. The apparatus 3 for cooling alunite is furnished with a pipe 51 for feeding the reduced alunite for subsequent hydrochemical processing to produce alumina, potassium sulphate and other products.

At least one of the fluidized bed apparatus of the herein-proposed plant: the apparatus 1 for roasting alunite, the apparatus 2 for reducing roasted alunite or the apparatus 3 for cooling reduced alunite, may have such dimensions that its length-to-width ratio falls within a range of from 5 to 15.

The proposed plant (FIG. 1) for heat treatment of powdered alunite operates in the following manner.

Liquid or gasous fuel and air are introduced into the means 18 for producing flue gases. The gases produced therein with a temperature of 800° C or 1100° C proceed along the pipe 17 into the bottom chamber 14 of the shaft heat exchanger 4. The means (furnace) 25 for producing flue gases is also charged with liquid or gaseous fuel and air. The flue gases produced therein and heated to a temperature of 800° C or 1100° C pass from the means 25 along the pipe 24 and enter the gas-distributing chamber 23 under the gas-distributing grate 22 of the apparatus 1 for roasting alunite. The flue gases from the apparatus 1 for roasting alunite proceed along the supply pipe 28 through the cyclone 21 and discharge pipe 20 to the bottom chamber 14 of the shaft heat exchanger 4. The flue gases from the means (furnace) 18 and those from the apparatus 1 for roasting alunite intermix in the bottom chamber 14 of the shaft heat exchanger 4 and flowing through the opening in the throat 16 enter the top chamber 9 of the shaft heat exchanger 4 and then the supply pipe 6. Alunite ore comminuted to a powderlike state is introduced by the feeder 10 into the supply pipe 6. On being heated in the supply pipe 6 alunite is entrained with the gases into the cyclone heat exchanger 5, wherein solid particles are separated from a gaseous phase. The solid particles collected in the cyclone heat exchanger 5 and heated to a temperature of 300-400° C pass along the descent pipe 8 into the top chamber 9 of the shaft heat exchanger 4.

A gas stream from the cyclone heat exchanger 5 proceeds via the discharge pipe 11 into the cyclone 12 where it is dedusted and exhausted along the descharge pipe 15 to the atmosphere. The dust collected in the cyclone 12 passes along the descent pipe 13 into the bottom chamber 14 of the shaft heat exchanger 4. Heated alunite admitted from the cyclone heat exchanger 5 into the top chamber 9 of the shaft heat exchanger 4 is acumulated there until a sufficient amount is collected to drop down into the bottom chamber 14 through the opening in the throat 16, the alunite being heated to a temperature of from 500 ° to 550° C, and almost 50% of initial hydrate moisture being driven off therefrom. From the bottom chamber 14 of the shaft heat exchanger 4 the alunite together with the dust collected in the cyclone 12 passes via the pipe 19 to the apparatus 1 for fluidized bed roasting of alunite.

In the apparatus 1 for roasting alunite, the latter (alunite) is heated with gases from the means (furnace) 25 to a temperature of 550° C or over with the ensuring removal of 80–90% of its initial hydrate moisture. Water vapors together with gases and dust carried from the fluidized bed of the apparatus 1 for roasting alunite pass via the supply pipe 28 into the cyclone 21. The dust collected in the cyclone 21 is returned along the descent pipe 29 into the fluidized bed of the apparatus 1 for roasting alunite. The dedusted gases from the cyclone 21 proceed along the discharge pipe 20 into the bottom chamber 14 of the shaft heat exchanger 4.

Roasted alunite from the apparatus 1 for roasting alunite passes through the channel of the labyrinth device 30 into the apparatus 2 for fluidized bed reducing of alunite.

As the means (furnaces) 18 and 25 are being heated up, fuel and air are fed to the means (furnace) 34 for producing flue gases. As the alunite is being accumulated in the apparatus 2 for reducing alunite, the temperature of the flue gases flowing out of the means (furnace) 34 into the apparatus 2 for reducing alunite is increased to 800° C and over.

From the means (furnace) 34 the flue gases flow via the pipe 33 into the gas-distributing chamber 32 under the gas-distributing grate 31 of the apparatus 2 for reducing alunite. When the fluidized bed of the roasted alunite in the apparatus 2 reaches a preset level, a reducer is introduced into the fluidized bed either through the device 35 or the means (furnace) 34. As for the reducers, use is made of such wellknown reagents as: the products obtained by processing oil, other gaseous or vaporous reducing agents.

Under the effect of the reducer, sulphur dioxide is liberated from alunite at a temperature of 560° C.

From the apparatus 2 for reducing alunite the gases containing sulphur dioxide flow together with dust via the supply pipe 37 into the cyclone 39 for purifying. The dust collected in the cyclone 39 returns along the descent pipe 38 into the apparatus 2 for reducing alunite. The gases containing sulphur dioxide and dedusted are led along the discharge pipe 40 to the production of sulphuric acid.

Reduced alunite pours from the apparatus 2 for reducing alunite via the channel in the labyrinth device 41 into the apparatus 3 for fluidized bed cooling of alunite from a temperature of 560° C to 100° C and below. Cooling is effected by blowing alunite with cold air supplied through the branch pipe 44 into the gas-distributing chamber 43 under the gas-distributing grate 42 into the fluidized bed of alunite. Arranged above the gas-distributing grate 42 are the heat-exchanging devices 46 built up of tubes in to which coolant (water) is introduced.

Dust-laden air from the apparatus 3 for cooling alunite flows via the supply pipe 47 to the cyclone 49 where it is purified from dust and exhausted to the atmosphere via the exhaust pipe 50. The dust collected in the cyclone 49 is returned into the apparatus 3 for cooling alunite via the descent pipe 48.

Here the heat treatment of alunite in the plant is completed. The cooled alunite supplied along the pipe 51 is carried for subsequent hydrochemical processing for the recovery of alumina, sulphates and other products.

Figure 2:
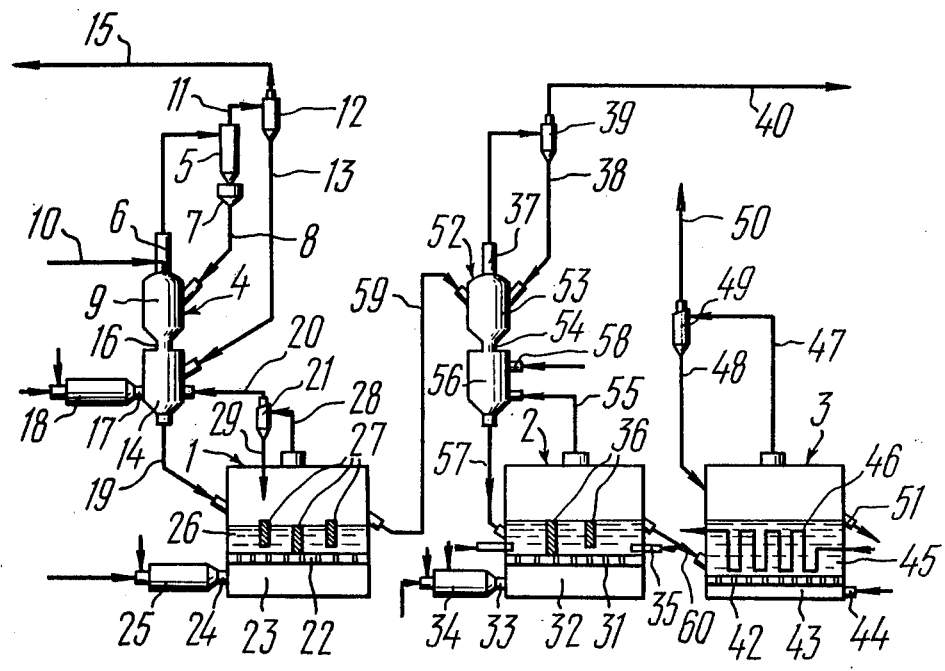
FIG. 2 shows diagrammatically the second exemplary embodiment of a plant, comprising an additional shaft heat exchanger located intermediate of an apparatus for roasting and that for reducing alunite.

Another exemplary embodiment of the proposed plant for heat treating powdered alunite (FIG. 2) comprises an additional shaft heat exchanger 52 for reducing alunite, built-in intermediate of the apparatus 1 for roasting alunite and apparatus 2 for its reducing.

The plant, according to the second exemplary embodiment, also comprises not only the known apparatus 1, 2 and 3 mounted on a support and adapted for sequential roasting, reduction and cooling of alunite in a fluidized bed, but the heat exchangers 4 and 5, means (furnaces) and pipe lines described in the disclosure of the first exemplary embodiment of the plant.

The apparatus 1 for roasting alunite (FIG. 2) communicates with a top chamber 53 of the additional shaft heat exchanger 52 via a pipe 59. The shaft heat exchanger 52 is adapted for heating and reducing of roasted alunite and for burning some reducer.

A throat 54 subdivides the shaft heat exchanger 52 into the top chamber 53 and a bottom chamber 56. The top chamber 53 communicates via the supply pipe 37 and the descent pipe 38 with the cyclone 39 for driving off dust from gases flowing out of the top chamber 53 of the shaft heat exchanger 52, and via the pipe 59 with the apparatus 1 for fluidized bed roasting of alunite.

The cyclone 39 is fitted with the discharge pipe 40 for supplying reaction gases after the shaft heat exchanger 52 for subsequent production of sulphuric acid and other sulphur-containing products.

The bottom chamber 56 of the shaft heat exchanger 52 communicates with the apparatus 2 for reducing alunite via a pipe 57 and a discharge pipe 55 and is fitted with a branch pipe 58 for supplying heated gas.

The apparatus 2 for fluidized bed reducing of roasted alunite has the gas-distributing grate 31 under which is arranged the gas-distributing chamber 32 connected via the pipe 33 with the means (furnace) 34 for producing flue gases and preparing reagents for reducing alunite. Mounted above the gas-distributing grate 31 in the fluidized bed of the apparatus 2 for reducing alunite are devices 35 for supplying reducing reagents and baffles 36 precluding the circulation of the reduced alunite in the fluidized bed in an opposite direction, i.e. from the unloading to the loading location. The apparatus 2 for reducing alunite is connected to the bottom chamber 56 of the shaft heat exchanger 52 via the pipe 57 and the discharge pipe 55 and to the apparatus 3 for cooling reduced alunite via a pipe 60.

The apparatus 3 for cooling reduced alunite comprises the gas distributing grate 42 under which is arranged the gas-distributing chamber 43 with the branch pipe 44 for supplying air for creating a fluidized bed of alunite and for its cooling. Set up above the grate 42 in the fluidized bed 45 are heat-exchanging devices 46 made up of tubes in which coolant is circulating. The apparatus 3 for cooling alunite communicates via the supply pipe 47 and the descent pipe 48 with the cyclone 49 for removing dust from gases flowing out of the apparatus 3 for cooling alunite. The cyclone 49 is provided with the exhaust pipe 50 through which it communicates with the atmosphere. The apparatus 3 for cooling alunite comprises the pipe 51 for supplying reduced cooled alunite for subsequent hydrochemical processing to recover alumina, sulphates and other products.

The plant, according to the second exemplary embodiment, comprising the shaft heat exchanger 52 (FIG. 2) for reducing the roasted alunite, operates essentially similarly to the plant described in the first exemplary embodiment, the only difference being in that from the apparatus 1 for fluidized bed roasting of alunite the alunite is supplied via the pipe 59 to the top chamber 53 of the shaft heat exchanger 52. Upon passing through the opening in the throat 54 and the bottom chamber 56 of the shaft heat exchanger 52 the alunite proceeds along the pipe 57 into the apparatus 2 for fluidized bed reducing of alunite. The flue gases produced in the means (furance) 34 at a temperature of 800° C or over are led via the pipe 33 into the gas-distributing chamber 32 under the gas-distributing grate 31 of the apparatus 2 for reducing alunite.

As soon as a sufficient amount of roasted alunite is accumulated in the apparatus 2 for reducing alunite the reducing agent is introduced either through the means (furnace) 34 or through the device 35 directly into the fluidized bed. The gases, containing sulphur dioxide, and some unreacted reducer flow from the apparatus 2 for reducing alunite via the discharge pipe 55 into the bottom chamber 56 of the shaft heat exchanger 52. Heated gas, e.g. air, is also fed into this chamber 56 through the branch pipe 58 in amounts sufficient for a burning up the unreacted reducer and for providing a temperature of about 560° C within the bottom chamber 56. The rest of the unreacted reducer is employed for reducing the roasted alunite.

The gases containing sulphur dioxide pass from the bottom chamber 56 of the second shaft heat exchanger 52 through the opening in the throat 54 into the top chamber 53 of the shaft heat exchanger 52 and upon flowing via the supply pipe 37 enter the cyclone 39. In the cyclone 39 the gases are dedusted and led via the discharge pipe 40 for the subsequent production of sulphuric acid. The dust collected in the cyclone 39 is returned via the descent pipe 38 into the top chamber 53 of the shaft heat exchanger 52. From the bottom chamber 56 of the shaft heat exchanger 52 the partially reduced alunite proceeds along the pipe 57 into the fluidized bed of the apparatus 2 for reducing alunite where it is reduced at a temperature of 560° C, this being accompanied by the liberation of almost 90% of initial sulphur dioxide fixed in aluminium sulphate. The reduced alunite is fed via the pipe 60 to the apparatus 3 for fluidized bed cooling of alunite. Further operation of the plant is similar to that outlined in the first embodiment.

The application of the plant, comprising the additional shaft heat exchanger 52 for reducing alunite offers a reduction in the reducer requirements for dissociation of aluminium sulphate contained in alunite by making use of the unreacted reducer that has passed through the fluidized bed of alunite from the apparatus 2 for reducing roasted alunite. The shaft heat exchanger 52 is adapted for heating and partial reducing of roasted alunite fed from the apparatus 1 for roasting alunite. The use of an additional shaft heat exchanger for reducing alunite diminishes materially the time period required for heat treating alunite which makes it possible to cut alkali-soluble alumina losses.

When testing the herein-proposed plant the following performance characteristics were obtained: the recovery of alumina from alunite and the dissociation degree was almost 90%; sulphur losses in the apparatus for fluidized bed roasting of alunite were ruled out; reducer requirements for reducing roasted alunite were decreased by 20%; a 30% increase in the production of sulphuric acid was ensured. A decrease in the height of the fluidized bed of alunite in the apparatus for roasting and reducing alunite allowed almost halving the power input and provided a 10-15% reduction in fuel consumption.

The plant of the invention is compact, convenient for attendance and for production process control.

What we claim is:

1. A plant for fluidized bed heat treatment of powdered alunite, comprising: a support; a shaft heat exchanger mounted on said support and having a throat subdividing its interior in height into a top and a bottom chamber so that the ratio of the passage cross-sectional areas of a wide and narrow parts falls within a range of from 2 to 12; a cyclone heat exchanger communicating with the top chamber of said shaft heat exchanger via a supply and a descent pipe; an initial alunite feeder connected to said supply pipe; a first cyclone for trapping powdered alunite from gas flowing via a pipe out of said cyclone heat exchanger; a pipe for returning the collected alunite from said first cyclone into the bottom chamber of said shaft heat exchanger; a first means for producing flue gases and for their forced feed into the bottom chamber of said shaft heat exchanger; an apparatus for fluidized bed roasting of alunite mounted on said support and communicating with the bottom chamber of said shaft heat exchanger; a second cyclone for trapping powdered alunite from gas flowing out of said apparatus for fluidized bed roasting of alunite, communicating therewith via a supply and a descent pipe and connected to the bottom chamber of said shaft heat exchanger by means of a discharge pipe; a second means for producing flue gases and for their forced feed into said apparatus for fluidized bed roasting of alunite; an apparatus for fluidized bed reducing of alunite mounted on said support and communicating with said apparatus for fluidized bed roasting of alunite through means for precluding mixing of gaseous components in said roasting and reducing beds; a third means for producing flue gases and for their forced feed into said apparatus for fluidized bed reducing of alunite; a device for supplying reagents into said apparatus for fluidized bed reducing of alunite; a third cyclone for trapping powdered alunite from gases flowing out of said apparatus for fluidized bed reducing of alunite communicating therewith via a supply and a descent pipe; an apparatus for fluidized bed cooling of reduced alunite mounted on said support and communicating with said apparatus for fluidized bed reducing of alunite through means for precluding mixing of gaseous components in said reducing and cooling beds; a device for forced feed of gas into said apparatus for fluidized bed cooling of reduced alunite; a fourth cyclone for trapping powdered alunite from gas flowing out of said apparatus for fluidized bed cooling of reduced alunite, communicating therewith via a supply and a descent pipe; and outlet means communicating with said apparatus for fluidized bed cooling of reduced alunite for releasing the reduced alunite from the treatment plant for further processing.

2. A plant, of claim 1 in which at least in one of its apparatus for fluidized bed heat treatment of powdered alunite the length-to-width radio falls within a range of from 5 to 15.

3. A plant for fluidized bed heat treatment of powdered alunite, comprising: a support; a first shaft heat exchanger mounted on said support and having a throat subdividing its interior in height into a top and bottom chamber so that the ratio of the passage cross-sectional areas of the wide and narrow parts falls within a range of from 2 to 12; a cyclone heat exchanger communicating with the top chamber of said first shaft heat exchanger via a supply and a descent pipe; an initial alunite feeder connected to said supply pipe; a first cyclone for trapping powdered alunite from gas flowing out of said cyclone heat exchanger; a pipe for returning the collected alunite from said first cyclone into the bottom chamber of said first shaft heat exchanger; the first means for producing flue gases and for their forced feed into the bottom chamber of said first shaft heat exchanger; an apparatus for fluidized bed roasting of alunite mounted on said support and communicating with the bottom chamber of said first shaft heat exchanger; a second cyclone for trapping powdered alunite from gas flowing out of said apparatus for fluidized bed roasting of alunite, communicating therewith via a supply and a descent pipe and connected to the bottom chamber of said first shaft heat exchanger by means of a discharge pipe; a second means for producing flue gases and their forced feed into said apparatus for fluidized bed roasting of alunite; A second shaft heat exchanger whose top chamber is connected via a pipe with said apparatus for roasting alunite; a third cyclone connected by means of a supply and a descent pipe to the top chamber of said second shaft heat exchanger; an apparatus for fluidized bed reducing of alunite mounted on said support and communicating with the bottom chamber of said second shaft heat exchanger via a supply and a descent pipe; a branch pipe for supplying heated gas into the bottom chamber of said second shaft heat exchanger; a third means for producing flue gases and for their forced feed into said apparatus for fluidized bed reducing of alunite; a device for supplying reagents into said apparatus for fluidized bed reducing of alunite; an apparatus for fluidized bed cooling of alunite mounted on said support and communicating with said apparatus for fluidized bed reducing of alunite; a device for forced feed of gases to said apparatus for fluidized bed cooling of reduced alunite; a fourth cyclone for trapping powdered alunite from gas flowing out of said apparatus for fluidized bed cooling of reduced alunite, communicating therewith via a supply and a descent pipe; and outlet means communicating with said apparatus for fluidized bed cooling of reduced alunite for releasing the reduced alunite from the treatment plant for further processing.

4. A plant of claim 3, in which at least in one of its apparatus for fluidized bed heat treatment of powdered alunite the length-to-width ratio falls within a range of from 5 to 15.

5. A plant of claim 1, wherein said means for precluding mixing of gaseous components, comprise labyrinths.

* * * * *